US012064987B2

(12) United States Patent
Raksha et al.

(10) Patent No.: US 12,064,987 B2
(45) Date of Patent: Aug. 20, 2024

(54) OPTICAL DEVICE WITH MAGNETIC FLAKES AND STRUCTURED SUBSTRATE

(71) Applicant: VIAVI SOLUTIONS INC., San Jose, CA (US)

(72) Inventors: Vladimir P. Raksha, Santa Rosa, CA (US); Cornelis Jan Delst, Fairfax, CA (US); Paul G. Coombs, Santa Rosa, CA (US)

(73) Assignee: VIAVI SOLUTIONS INC., Chandler, AZ (US)

( * ) Notice: Subject to any disclaimer, the term of this patent is extended or adjusted under 35 U.S.C. 154(b) by 0 days.

(21) Appl. No.: 16/857,845

(22) Filed: Apr. 24, 2020

(65) Prior Publication Data

US 2020/0338922 A1 Oct. 29, 2020

Related U.S. Application Data

(60) Provisional application No. 62/839,315, filed on Apr. 26, 2019.

(51) Int. Cl.
*B42D 25/369* (2014.01)
*B42D 25/328* (2014.01)
*B42D 25/29* (2014.01)

(52) U.S. Cl.
CPC ......... *B42D 25/369* (2014.10); *B42D 25/328* (2014.10); *B42D 25/29* (2014.10)

(58) Field of Classification Search
CPC .................................................... B42D 25/369
USPC .......................................................... 235/493
See application file for complete search history.

(56) References Cited

U.S. PATENT DOCUMENTS

| | | | | |
|---|---|---|---|---|
| 5,073,009 | A * | 12/1991 | Tovi ........................ | G02C 7/021 351/159.63 |
| 7,880,943 | B2 | 2/2011 | Kittler, Jr. et al. | |
| 11,823,003 | B2 | 11/2023 | Dinoev et al. | |
| 2002/0160194 | A1 | 10/2002 | Phillips et al. | |
| 2003/0176605 | A1 | 9/2003 | Coates et al. | |
| 2004/0051297 | A1 | 3/2004 | Raksha et al. | |
| 2005/0106367 | A1 | 5/2005 | Raksha et al. | |
| 2009/0230670 | A1 * | 9/2009 | Schmid .................. | B42D 25/29 283/85 |
| 2012/0001116 | A1 | 1/2012 | Raksha et al. | |

(Continued)

FOREIGN PATENT DOCUMENTS

| | | | |
|---|---|---|---|
| CN | 1900178 | A | 1/2007 |
| CN | 101011916 | A | 8/2007 |
| CN | 101058285 | A | 10/2007 |

(Continued)

OTHER PUBLICATIONS

Chen Yi, "Collection & research of World Polymer Banknote", Shanghai Science and Technology Publisher, Jan. 1, 2018, pp. 42-48. (English translation of portions of reference and Office Action cited as concise statement).

(Continued)

*Primary Examiner* — Rafferty D Kelly
(74) *Attorney, Agent, or Firm* — MANNAVA & KANG, P.C.

(57) ABSTRACT

An optical device comprising a structured substrate; a reflective layer on the structured substrate; and a coating with magnetic flakes on the reflective layer is disclosed. A method of making and using an optical device is also disclosed.

20 Claims, 4 Drawing Sheets

10

(56) References Cited

U.S. PATENT DOCUMENTS

2014/0077485 A1* 3/2014 Raksha ................ B41M 7/0072
283/67

FOREIGN PATENT DOCUMENTS

| | | | |
|---|---|---|---|
| CN | 102224015 | A | 10/2011 |
| CN | 102481801 | A | 5/2012 |
| CN | 104169098 | A | 11/2014 |
| CN | 105082713 | A | 11/2015 |
| CN | 106925493 | A | 7/2017 |
| DE | 102015010945 | A1 | 2/2017 |
| DE | 102017003603 | A1 | 10/2018 |
| EP | 3254863 | A1 | 12/2017 |
| WO | 2014118569 | A1 | 8/2014 |
| WO | 2019057327 | A1 | 3/2019 |

OTHER PUBLICATIONS

“English translation of China OA for Application No. CN 202080031300.X”, mailed Jul. 7, 2023, 8 pages.

* cited by examiner

OPTICAL DEVICE WITH MAGNETIC FLAKES AND STRUCTURED SUBSTRATE

RELATED APPLICATION

The present disclosure claims priority to U.S. Provisional Application No. 62/839,315, filed Apr. 26, 2019, the disclosure of which is hereby incorporated by reference.

FIELD OF THE INVENTION

The present disclosure generally relates to an optical device including a structured substrate; a reflective layer on the structured substrate; and a coating with magnetic flakes on the reflective layer. Methods of making and using the optical device are disclosed herein.

BACKGROUND OF THE INVENTION

Optical devices exhibiting a viewing angle-dependent visual appearance are used as efficient anti-copy means on bank notes and security documents. Optically variable inks are often used that include thin film optical interference structures having a layered structure of a reflective layer, a dielectric layer, and an absorber layer. However, thin film optical interference structures are applied as an opaque coating directing on top of a substrate. In this manner and with this opaque coating, it is not possible to hide and reveal an image on a substrate at certain angles of view. All that is seen is the color-shift.

Magnetic flakes have been used to create hide and reveal effects by using alignment of the flakes to create a "Venetian Blind Effect." The Venetian Blind layer of magnetic flakes, at a transparent angle, absorbs a lot of light. Additionally, only light that has the exact right angle passes in and out through the Venetian Blind layer thereby contributing to the underlying image and color. However, this reduces the lightness and the chromaticity of the image.

What is needed is a way to brighten the image, e.g., a higher contrast, to the underlying image.

BRIEF DESCRIPTION OF THE DRAWINGS

Features of the present disclosure are illustrated by way of example and not limited in the following figure(s), in which like numerals indicate like elements, in which.

SUMMARY OF THE INVENTION

Figure 1:
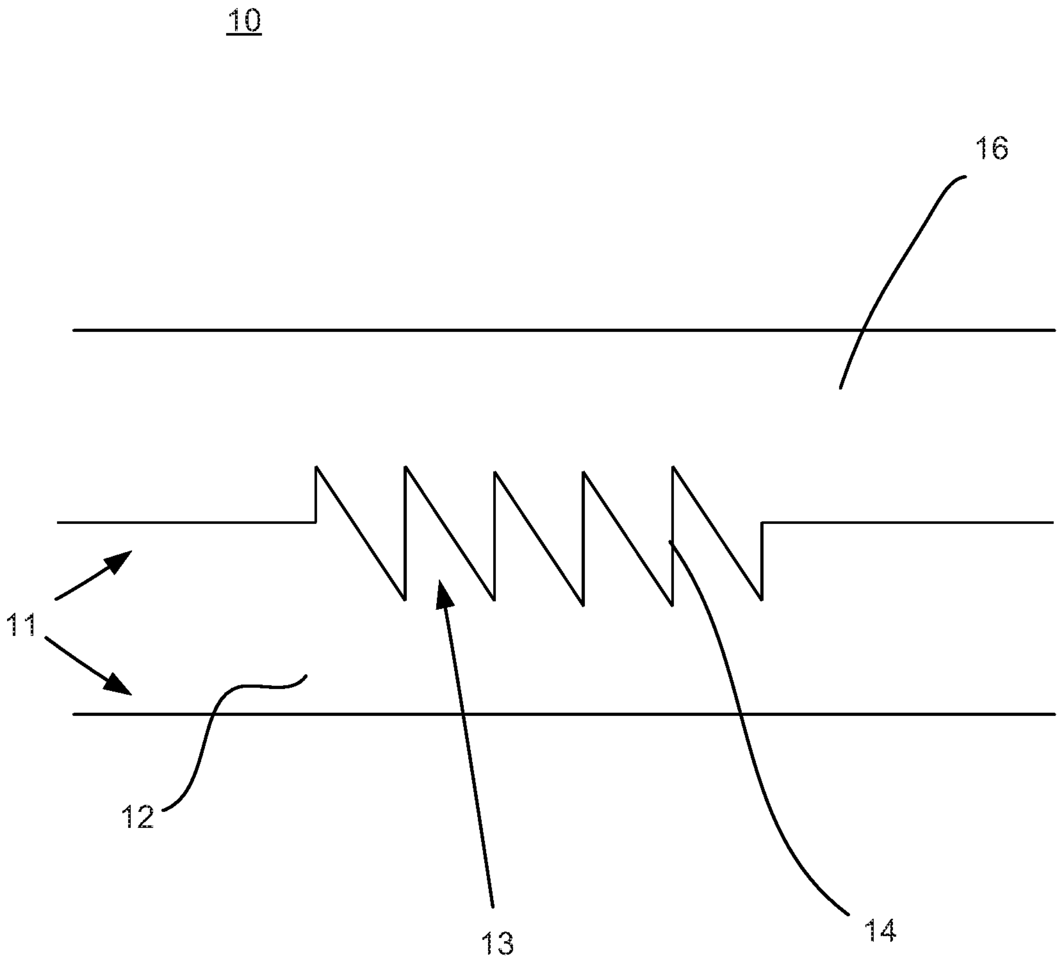
FIG. 1 is a cross-section of an optical device according to an aspect of the present invention.

In an aspect, there is disclosed optical device comprising a structured substrate; a reflective layer on the structured substrate; and a coating with magnetic flakes on the reflective layer or on another side of the structured substrate In another aspect, there is disclosed a method of making an optical device, comprising forming an image on a structured substrate; applying a reflective layer on the structured substrate so that the reflective layer mimics a topography of the structured substrate; and applying a coating with magnetic flakes.

In another aspect, there is disclosed a method of using an optical device, comprising forming an optical device including a structured substrate; a reflective layer on the structured substrate; and a coating with magnetic flakes on the reflective layer; and tilting the optical device to visualize an image, formed on the structured substrate, as a top layer.

In a further aspect, there is disclosed, a method of using an optical device comprising forming an optical device including a structured substrate, a reflective layer on the structured substrate, and a coating with magnetic flakes on a side of the substrate that is not structured; and tilting the optical device to visualize an image, formed on the structured substrate, as a top layer.

Additional features and advantages of various embodiments will be set forth, in part, in the description that follows, and will, in part, be apparent from the description, or can be learned by the practice of various embodiments. The objectives and other advantages of various embodiments will be realized and attained by means of the elements and combinations particularly pointed out in the description herein.

DETAILED DESCRIPTION OF THE INVENTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Additionally, the elements depicted in the accompanying figures may include additional components and some of the components described in those figures may be removed and/or modified without departing from scopes of the present disclosure. Further, the elements depicted in the figures may not be drawn to scale and thus, the elements may have sizes and/or configurations that differ from those shown in the figures.

It is to be understood that both the foregoing general description and the following detailed description are exemplary and explanatory only, and are intended to provide an explanation of various embodiments of the present teachings. In its broad and varied embodiments, disclosed herein are optical devices; and a method of making and using optical devices.

The present invention is directed to an optical device 10 comprising a structured substrate 12; a reflective layer 14; and a coating 16 with magnetic flakes, as shown in FIG. 1. The coating 16 with magnetic flakes 20 can create angle-dependent transparency variations.

The structured substrate 12 can include a surface, such as a plurality of surfaces, arranged to form an image. The structured substrate 12 can include horizontal surfaces (i.e., planar with an absence of structure) and structured surfaces (e.g., such as angled surfaces relative to the horizontal surface). For example, as shown in FIG. 1, the left and right ends and the bottom edge illustrate horizontal surfaces 11 and the center illustrates a structured surface 13. It should be noted that the structured surfaces 13 can be present on a top edge (FIGS. 1 and 2) or a bottom edge (FIGS. 3 and 4) of the structured substrate. The structured substrate 12 can include a surface forming an image that is defined by an area shape and configuration. The image can be present on one or more of the surfaces of the substrate 12. The image can include, but is not limited to, words, symbols, numbers, patterns, and shapes.

Any substrate 12 commonly used for producing optical devices 10 can be employed for use as the structured substrate 12. Suitable substrate 12 materials include, but are not limited to, paper, cardboard, textiles, glass, polymers, plastics or combinations thereof. The substrate 12 material can be a transparent material. For example, the substrate 12 can be an embossed UV-curable material, coated on polyethylene terephthalate, applied to a paper on the non-observing side. In an aspect, the structured substrate 12 can be a transparent material in which the image can be directly produced on or in a surface of the substrate to form the structured substrate 12.

In an aspect, the substrate 12 can be a material that is structured, i.e., provided with a plurality of surfaces that form the image and a background. In an aspect, the image can be formed with embossing or a micro-mirror array having co-planar surfaces. In another aspect, the image can be formed with a grating, such as a blazed grating, or variants thereof. For example, the image can be formed with a grating at a first angle and the background can be formed with a grating at a second angle that is offset from the first angle, such as 90° from the first angle. A blazed grating includes a plurality of grating lines that possess a triangular, sawtooth-shaped cross-section, forming a step structure. The steps can be tilted at the so-called blaze angle with respect to the surface of the substrate 12. The blaze angle can be optimized to maximize efficiency for the angle of the incident light and taking in consideration the intended uses of the optical device 10. The plurality of surfaces of the structured substrate 12 formed by the blazed grating can reflect light at 45° of the surface angle. For example, if the surface angle is 30°, then the reflected light angle would be 75°. In an aspect, the plurality of surfaces of the structured substrate 12 that form the image can be reflective at the transparent angle of the coating 16 of magnetic flakes 20. In this manner, the brightness of the image can be enhanced. Additionally, the image can reflect far less at other angles which makes it easier to achieve an angle-dependent disappearance i.e., hiding, effect. Some areas of the substrate 12 may not be structured, such as a horizontal planar surface, and the image formed by the structured surfaces can rely on different reflection angles of the structured surfaces and/or the absence of structure in some areas.

A reflective layer 14 can be applied on the structured substrate 12. The reflective layer 14 can be applied in any manner so long as the reflective layer 14 mimics a topography of the structured substrate 12, such as each surface, shape, and/or angle of the plurality of surfaces. In particular, the reflective layer 14 can be a metalized surface on the structured substrate 12. The reflective layer 14 can be microstructured or can include a grating that is the same as the structured substrate 12.

The reflective layer 14 can include a metal, non-metal, or metal alloy. In one example, the materials for the reflective layer 14 can include any materials that have reflective characteristics in the desired spectral range. For example, any material with a reflectance ranging from 5% to 100% in the desired spectral range. An example of a reflective material can be aluminum, which has good reflectance characteristics, is inexpensive, and is easy to form into or deposit as a thin layer. Non-limiting examples of reflective opaque material for use in the reflective layer 14 include aluminum, copper, silver, gold, platinum, palladium, nickel, cobalt, niobium, chromium, tin, iron, and combinations or alloys of these or other metals can be used as the reflective layer 14. In an aspect, the material for the reflective layer 14 can be a white or light colored metal. In other examples, the reflective layer 14 can include, but is not limited to, the transition and lanthanide metals and combinations thereof; as well as metal carbides, metal oxides, metal nitrides, metal sulfides, a combination thereof, or mixtures of metals and one or more of these materials. In an aspect, the reflective layer 14 may include a transparent or semi-transparent material chosen from glass, silica, titania, alumina, natural mica, synthetic mica, and bismuth oxychloride. In another aspect, the reflective layer 14 can include a metalloid material chosen from silicon, germanium, and molybdenum.

The thickness of the reflective layer 14 can range from about 10 nm to about 3 microns, for example from about 30 nm to about 1 micron, and as a further example from about 40 nm to about 200 nm.

A coating 16 of magnetic flakes 20 can be applied to the reflective layer 14. In an aspect, the coating 16 of magnetic flakes 20 can be an external layer of the optical device 10. The coating 16 can include a curable binder 18. Non-limiting examples of curable, binders 18 include vinylic resins, acrylic resins, urethane-alkyd resins, mixtures thereof, and mixtures with other polymers. The binder 18 can be typically transparent, such as clear and/or colorless, but can be tinted, and the magnetic flakes 20 can be reflective.

In one example, the coating 16 comprising magnetic flakes 20 can be applied onto the reflective layer 14 and/or the structured substrate 12 in any manner, including but not limited to, a liquid coating process. The coating 16 can be applied in a thickness that allows for orientation of the magnetic flakes 20 in all directions.

Many configurations of coating 16 are possible. In one configuration, the magnetic flakes 20 can be distributed evenly throughout the coating 16. In another configuration, the magnetic flakes 20 can have a higher concentration in some areas of coating 16 than in other areas. And in yet another configuration, some portions of the volume of coating 16 can be essentially free of the magnetic flakes 20.

The magnetic flakes 20 can be any size or shape and can include a material that can be magnetized in a magnetic field. Upon application of a magnetic field, the magnetic flakes 20 can be oriented in a predetermined direction. Once the orientation of the magnetic flakes 20 is obtained, the coating 16 with the magnetic flakes 20 can be cured.

The magnetic flakes 20 are generally small, thin flakes that are flat or reasonably flat. Typical dimensions for the magnetic flake 20 might be about twenty microns across and about one micron thick; however, these dimensions are merely exemplary and not limiting. Much larger or much smaller flakes could be used, as could flakes with different aspect ratios. Optically variable pigment ("OVMP"™) pigment flakes include an optical interference structure, such as a Fabry-Perot structure, made from thin film layers. The OVMP shifts color with viewing angle. Different optical interference designs can produce various hues and color travel. A thin film layer of magnetic material, such as a layer of nickel or ferrochrome about 25 to about 250 nm thick can provide a suitable magnetic structure for orienting or aligning pigment flakes within coating 16. Other magnetic materials could be used, and suitable materials might form permanent magnets or not, but it is generally desirable to avoid permanent magnetization of the flakes prior to application to avoid clumping. Some magnetic flakes 20 might be simply made from magnetic material, such as nickel flakes, which could be used for a reflective, non-color-shifting effect.

The coating 16 comprising the magnetic flakes 20 can be applied to the reflective layer 14 and/or the structured substrate 12 using a deposition technique, such that the coating 16 is external to either the reflective layer 14 and/or the structured substrate 12. The coating 16 of the magnetic flakes 20 can be applied to any layer of the optical device 10 to either completely cover a layer or cover a portion of a layer. For example, the coating 16 of the magnetic flakes 20 can cover a portion of the reflective layer 14. A magnetic field can be applied to the magnetic flakes 20 to orient or align one or more of the flakes while the binder 18 in the coating 16 is still fluid. The binder 18 can then dry, cure, or set to fix the alignment of the magnetic flakes 20.

The magnetic flakes 20 can be arranged to achieve a Venetian blind effect. In particular, the magnetic flakes 20 can be aligned so that along a specific direction of observation they give visibility to the reflective layer 14 and/or structured substrate 12 so that the image present on or in the structured substrate 12 becomes apparent to the observer while, at the same time, the magnetic flakes 20 impede the visibility along another direction of observation. The alignment of magnetic flakes 20 can be at a similar angle throughout the coating 16, or the alignment of the magnetic flakes 20 can be at a different angle in a portion of the coating 16 so that the Venetian blind effect occurs at different viewing angles or orientations.

At certain alignment angles the magnetic flakes 20 can create a foil-like appearance by reflecting a large fraction of the incoming light so that the underlying image is not seen. At other alignment angles, much of the incoming light passes between the aligned flakes and reaches the structured substrate 12 which reflects the light, and the underlying image is discernable.

In an aspect, the optical device 10 can further include at least one layer, such as a base 26, an adhesive 24, a multilayer coating 22, or combinations thereof. The at least one layer can be located in various positions throughout the optical device 10 depending upon the intended visual effect, light source, angle of observation, etc. In a further aspect, the multilayer coating 22 can comprise a multilayer optical interference coating. In another aspect, the multilayer coating 22 can comprise a color shifting coating.

Figure 2:
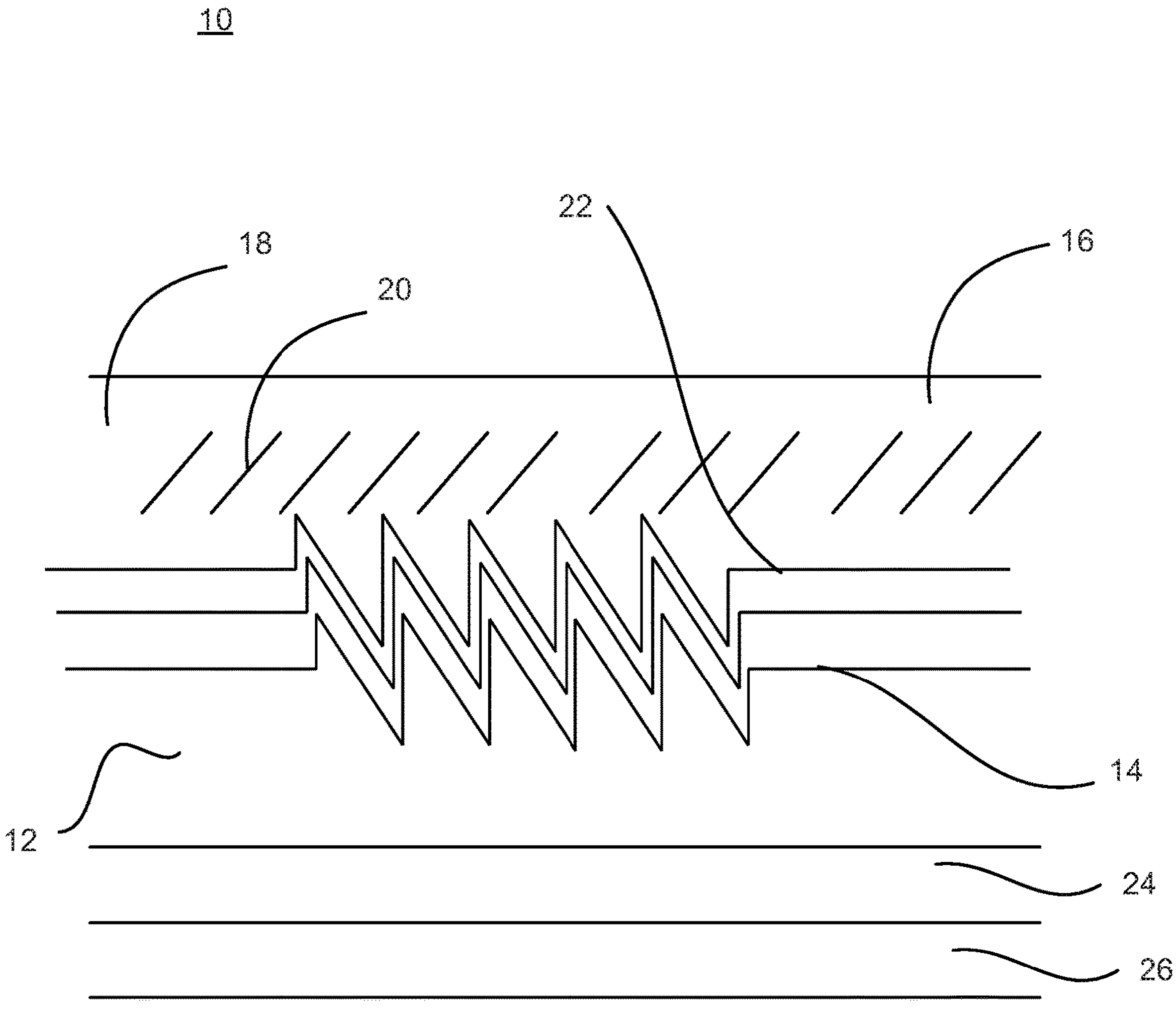
FIG. 2 is a cross-section of an optical device according to another aspect of the present invention.

FIG. 2 illustrates a cross-section of an optical device 10 including a base 26 having an adhesive 24 applied to a surface of the base 26. Non-limiting examples of the base 26 include a document, a banknote, paper, cardboard, any material that can support an optical device, or any material that can include a security feature. The adhesive 24 can be any material, colored or transparent, that can affix or bond the base 26 to the other layers in the optical device 10. For example, the structured substrate 12 can be adhered to the base 26 via adhesive 24.

As shown in FIG. 2, the optical device 10 can also include a multilayer coating 22. The multilayer coating 22 can be positioned anywhere within the optical device 10, such as between the reflective layer 14 and the coating 16 of magnetic flakes 20. The multilayer coating 22 can be opaque or can provide transmission at one or more wavelengths. In the multilayer coating 22, each layer can be the same or different, for example in terms of the materials present in each layer of the multiple layers or in terms of colors visualized by each layer. For example, the multilayer coating 22 can include a reflector layer, a dielectric layer and an absorber layer. The multilayer coating 22 can be opaque and can be positioned upon the structured substrate and/or adjacent to the reflective layer 14. The multilayer coating 22 can be an optical interference coating.

Figure 3:
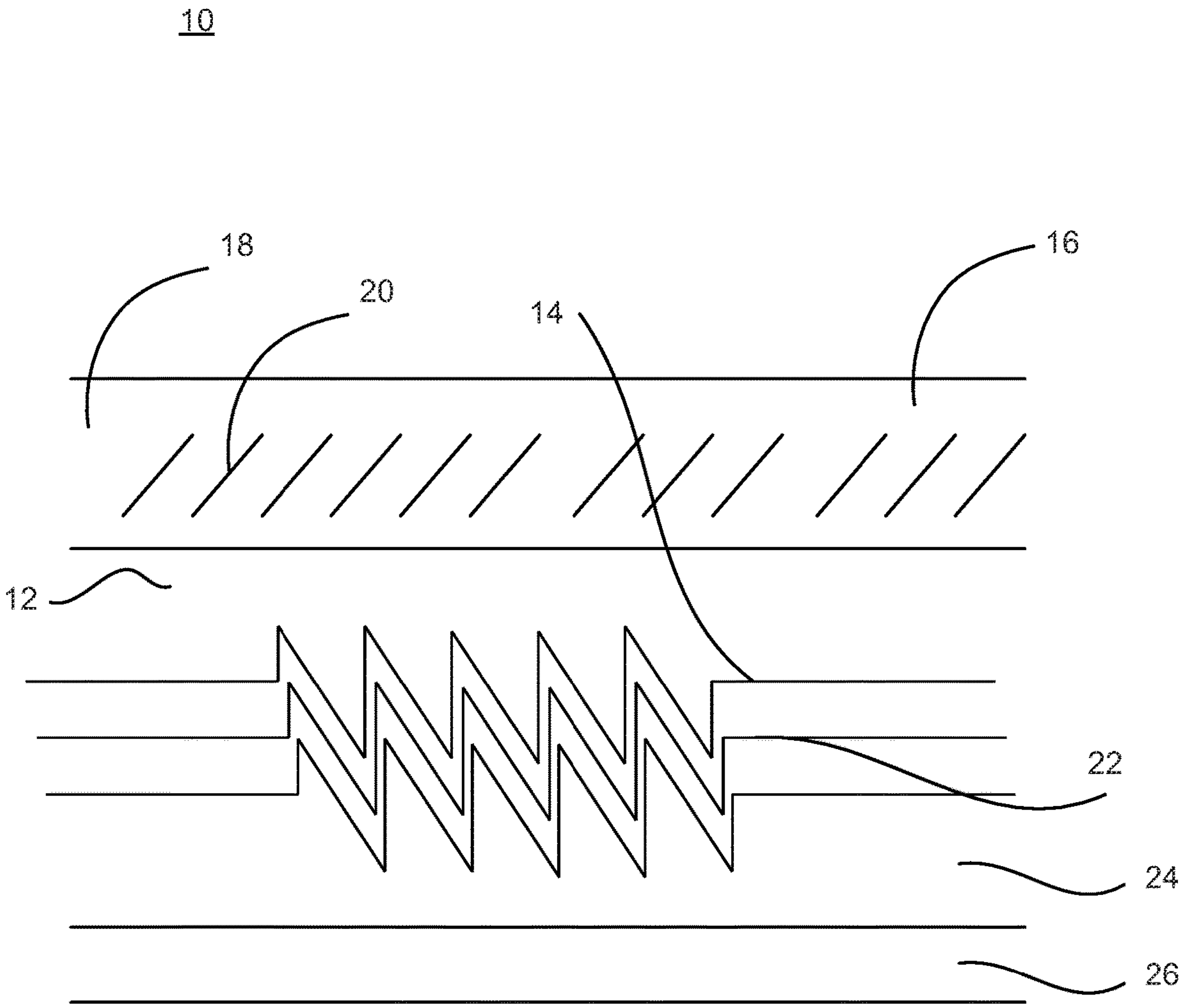
FIG. 3 is a cross-section of an optical device according to an aspect of the present invention.

FIG. 3 illustrates a cross-section of an optical device 10 according to another aspect. The optical device 10 can include a base 26 with an adhesive 24 affixing the multilayer coating 22 to the base 26. The multilayer coating 22 can be metallic, opaque, or can provide transmission at one or more wavelengths. The multilayer coating 22 can be positioned between the adhesive 24 and the reflective layer 14. The structured substrate 12 can be between the reflective layer 14 and the coating 16 with magnetic flakes 20.

Figure 4:
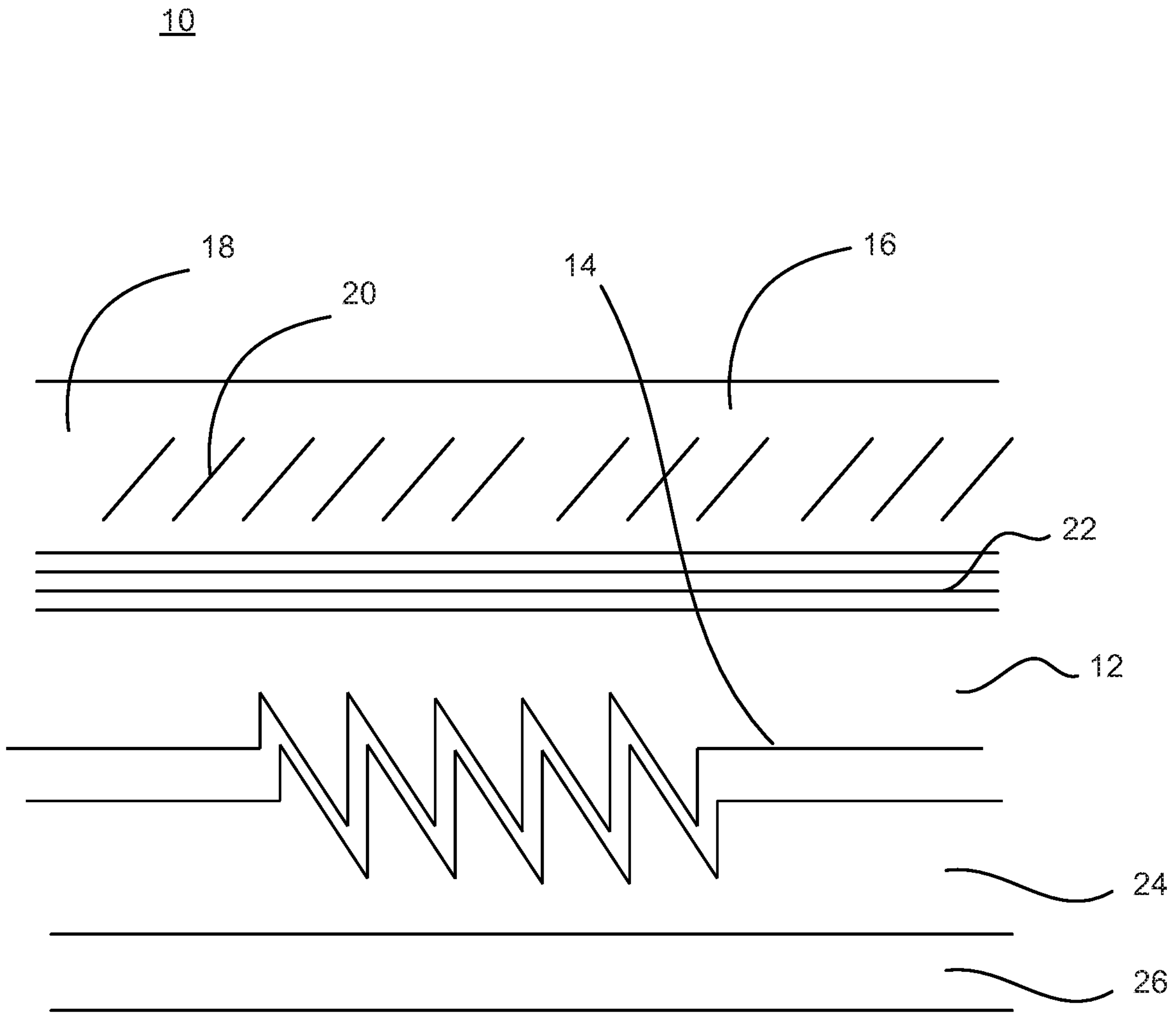
FIG. 4 is a cross-section of an optical device according to another aspect of the present invention.

FIG. 4 illustrates a cross-section of an optical device 10 according to another aspect. The optical device 10 can include a base 26, an adhesive 24, a reflective layer 14, a structured substrate 12, a multilayer coating 22, and a coating 16 of magnetic flakes 20. The structured substrate 12 can be transparent, colorless, or can be colored. The multilayer coating 22 can be a transparent color shifting multilayer dichroic coating. For example, the multilayer coating 22 can be stack of alternating layers of high refractive index materials and low refractive index materials. As another example, the multilayer coating 22 can comprise a transparent, colored resin.

A method of making the optical device 10 can include forming an image on a structured substrate 12; applying a reflective layer 14 on the structured substrate so that the reflective layer 14 mimics a topography of the structured substrate 12; and applying a coating 16 comprising magnetic flakes 20. The method can include applying a multilayer coating 22 between the reflective layer 14 and the coating 16 of magnetic flakes 20. The method can further include providing a base 26 and applying an adhesive 24 to the base. The method can also include adhering the structured substrate 12 to the base 26 via the adhesive 24. The method can also include applying a multilayer coating 22, such as an optical interference colorant, to the reflective layer 14 so that the multilayer coating 22 mimics a topography of the reflective layer 14. In one aspect, the multilayer coating, such as an optical interference colorant can comprise a color shifting colorant.

A method of making an optical device can include providing a base 26, applying an adhesive 24 to the base, adhering a multilayer coating 22 to the adhesive 24, applying a reflective layer 14 to the multilayer coating 22, applying a structured substrate 12 to the multilayer coating 22, and applying a coating 16 with magnetic flakes 20 to the structured substrate 12. The reflective layer 14 and/or the multilayer coating 22 can mimic a topography of the structured substrate 12.

A method of making an optical device can include providing a base 26, applying an adhesive 24 to the base, applying a reflective layer 14 to the adhesive 24, applying a structured substrate 12 to the reflective layer 14, applying a multilayer coating 22 to the structured substrate 12, and applying a coating 16 with magnetic flakes 20 to the multilayer coating 22. The reflective layer 14 and/or the adhesive 24 can mimic a topography of the structured substrate 12.

A method of using an optical device 10, can include forming an optical device 10 including a structured substrate 12, a reflective layer 14 on the structured substrate 12, and a coating 16 with magnetic flakes 20 on the reflective layer 14; and tilting the optical device 10 to visualize an image formed on the structured substrate 12 as a top layer. The coating 16 with magnetic flakes 20 can be an external layer of the optical device 10. The coating 16 with magnetic flakes 20 can exhibit a Venetian blind effect. In an aspect, the image can be visualized between the magnetic flakes 20 that exhibit the Venetian blind effect. In another aspect, the image is not visualized between the magnetic flakes 20 that exhibit the Venetian blind effect. As an additional option, the area of the reflective layer 14 covered by the coating 16 can be patterned, and thereby not cover all areas of reflective layer 14.

A method of using an optical device 10, can include forming an optical device 10 including a structured substrate 12, a reflective layer 14 on the structured substrate 12, and a coating 16 with magnetic flakes 20 on a side of the structured substrate 12 that is not structured; and tilting the optical device 10 to visualize an image formed on the structured substrate 12 as a top layer. The coating 16 with magnetic flakes 20 can exhibit a Venetian blind effect. In an aspect, the image can be visualized between the magnetic flakes 20 that exhibit the Venetian blind effect. In another aspect, the image is not visualized between the magnetic flakes 20 that exhibit the Venetian blind effect. As an additional option, the area of the reflective layer 14 covered by the coating 16 can be patterned, and thereby not cover all areas of reflective layer 14.

From the foregoing description, those skilled in the art can appreciate that the present teachings can be implemented in a variety of forms. Therefore, while these teachings have been described in connection with particular embodiments and examples thereof, the true scope of the present teachings should not be so limited. Various changes and modifications can be made without departing from the scope of the teachings herein.

This scope disclosure is to be broadly construed. It is intended that this disclosure disclose equivalents, means, systems and methods to achieve the devices, activities and mechanical actions disclosed herein. For each device, article, method, mean, mechanical element or mechanism disclosed, it is intended that this disclosure also encompass in its disclosure and teaches equivalents, means, systems and methods for practicing the many aspects, mechanisms and devices disclosed herein. Additionally, this disclosure regards a coating and its many aspects, features and elements. Such a device can be dynamic in its use and operation, this disclosure is intended to encompass the equivalents, means, systems and methods of the use of the device and/or optical device of manufacture and its many aspects consistent with the description and spirit of the operations and functions disclosed herein. The claims of this application are likewise to be broadly construed. The description of the inventions herein in their many embodiments is merely exemplary in nature and, thus, variations that do not depart from the gist of the invention are intended to be within the scope of the invention. Such variations are not to be regarded as a departure from the spirit and scope of the invention.

What is claimed is:

1. An optical device comprising:

a structured substrate comprising a topography that includes an unstructured, planar portion having a planar surface and a structured, non-planar portion having a plurality of adjacent, angled surfaces that are angled relative to the planar surface and arranged to form an image on the substrate;

a reflective layer on the structured substrate, wherein the reflective layer mimics the topography; and a coating with magnetic flakes on the reflective layer or on another side of the structured substrate, the magnetic flakes being aligned to provide a transparent angle for viewing the image and the unstructured planar portion, wherein the plurality of adjacent, angled surfaces are angled to provide improved reflectivity at the transparent angle compared with the reflectivity of the unstructured, planar portion so that the structured-non-planar portion has the effect of appearing brighter than the unstructured planar portion if both are viewed at the transparent angle.

2. The optical device of claim 1, wherein the structured substrate includes a surface having an image defined by a structure area shape and configuration of the topography.

3. The optical device of claim 2, wherein the image includes words, symbols, numbers, patterns, or shapes.

4. The optical device of claim 1, wherein the structured substrate includes a transparent material.

5. The optical device of claim 1, wherein the structured substrate includes a plurality of surfaces that can reflect light at a predetermined angle.

6. The optical device of claim 2, wherein the image formed on the structured substrate is visualized as a top layer.

7. The optical device of claim 1, wherein the coating of magnetic flakes exhibits a Venetian blind effect.

8. The optical device of claim 1, wherein the coating of magnetic flakes can form a second image.

9. The optical device of claim 8, wherein the second image formed of the coating of magnetic flakes is visualized as a bottom layer.

10. The optical device of claim 1, further comprising a multilayer coating between the reflective layer and the coating of magnetic flakes.

11. The optical device of claim 1, further comprising a multilayer coating between the reflective layer and an adhesive.

12. The optical device of claim 1, wherein the coating with magnetic flakes covers all of the reflective layer.

13. The optical device of claim 1, wherein the coating with magnetic flakes covers a portion of the reflective layer.

14. The optical device of claim 1, wherein the reflective layer comprises a metal.

15. The optical device of claim 14, wherein the metal is chosen from aluminum, copper, silver, gold, platinum, palladium, nickel, cobalt, niobium, chromium, tin, iron, and combinations or alloys thereof.

16. A method of making an optical device, comprising:

forming an image on a structured substrate, the structured substrate comprising a topography that includes an unstructured, planar portion having a planar surface and a structured, non-planar portion having a plurality of adjacent, angled surfaces that are angled relative to the planar surface and arranged to form an image on the substrate;

applying a reflective layer on the structured substrate so that the reflective layer mimics the topography of the structured substrate; and applying a coating with magnetic flakes, the magnetic flakes being aligned to provide a transparent angle for viewing the image and the unstructured planar portion, wherein the plurality of adjacent, angled surfaces are angled to provide improved reflectivity at the transparent angle compared with the reflectivity of the unstructured, planar portion so that the structured-non-planar portion has the effect of appearing brighter than the unstructured planar portion if both are viewed at the transparent angle.

17. A method of using an optical device, comprising:

forming an optical device including a structured substrate, the structured substrate comprising a topography that includes an unstructured, planar portion having a planar surface and a structured, non-planar portion having a plurality of adjacent, angled surfaces that are angled relative to the planar surface and arranged to form an image on the substrate; a reflective layer on the structured substrate, wherein the reflective layer mimics the topography; and a coating with magnetic flakes on the reflective layer, the magnetic flakes being aligned to provide a transparent angle for viewing the image, wherein the plurality of adjacent, angled surfaces are angled to provide improved reflectivity at the transparent angle compared with the reflectivity of the unstructured, planar portion; and tilting the optical device to visualize an image, formed on the structured substrate, as a top layer.

18. The method of claim 17, wherein the coating with magnetic flakes exhibits a Venetian blind effect.

19. The method of claim 17, wherein the image is brighter than a portion of the structured substrate that does not form the image.

20. A method of using an optical device, comprising:

forming an optical device including a structured substrate, the structured substrate comprising: a topography that includes an unstructured, planar portion having a planar surface and a structured, non-planar portion having a plurality of adjacent, angled surfaces that are angled relative to the planar surface and arranged to form an image on the substrate; a reflective layer on the structured substrate, wherein the reflective layer mimics the topography; and a coating with magnetic flakes on a side of the substrate that is not structured, the magnetic flakes being aligned to provide a transparent angle for viewing the image and the unstructured planar portion;

wherein the plurality of adjacent, angled surfaces are angled to provide improved reflectivity at the transparent angle compared with the reflectivity of the unstructured, planar portion so that the structured-non-planar portion has the effect of appearing brighter than the unstructured planar portion if both are viewed at the transparent angle; and tilting the optical device to visualize an image, formed on the structured substrate, as a top layer.

* * * * *